United States Patent
Peng et al.

(10) Patent No.: US 8,446,714 B2
(45) Date of Patent: May 21, 2013

(54) ELECTRONIC DEVICE HAVING CONNECTING MECHANISM

(75) Inventors: Ke-Hui Peng, Shenzhen (CN); Na Wang, Shenzhen (CN); Min-Li Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 221 days.

(21) Appl. No.: 13/150,288

(22) Filed: Jun. 1, 2011

(65) Prior Publication Data

US 2012/0050965 A1 Mar. 1, 2012

(30) Foreign Application Priority Data

Aug. 26, 2010 (CN) .......................... 2010 1 0263665

(51) Int. Cl.
*G06F 1/16* (2006.01)
(52) U.S. Cl.
USPC ............ 361/679.07; 361/679.02; 361/679.27; 248/917; 248/918; 312/223.1; 312/223.2

(58) Field of Classification Search
USPC ..................................................... 361/679.07
See application file for complete search history.

(56) References Cited

U.S. PATENT DOCUMENTS

| 7,027,297 | B1* | 4/2006 | Mizuno et al. | 361/679.07 |
|---|---|---|---|---|
| 7,551,431 | B2* | 6/2009 | Nakajima | 361/679.06 |
| 7,706,137 | B2* | 4/2010 | Iijima et al. | 361/679.07 |
| 7,957,125 | B2* | 6/2011 | Iwata | 361/679.07 |
| 2004/0061999 | A1* | 4/2004 | Takemoto et al. | 361/683 |
| 2006/0171112 | A1* | 8/2006 | Lev et al. | 361/686 |

* cited by examiner

*Primary Examiner* — Anthony Q Edwards
(74) *Attorney, Agent, or Firm* — Altis Law Group, Inc.

(57) ABSTRACT

An electronic device includes a front cover, a rear cover engaging with the front cover, and a connecting mechanism fixed to the front cover. The front cover is secured to the rear cover to cooperatively define a receiving space for receiving a part of the connecting mechanism. The front cover includes a first panel defining two limiting members and a first sidewall extending from a rim of the first panel and defining two latching members. The rear cover includes a second panel defining two protrusions and a second sidewall extending from a rim of the second panel and defining two hook members. The protrusions correspond to the limiting members and are fixed thereto, and the hook members correspond to the latching members and engage therewith.

10 Claims, 5 Drawing Sheets

ELECTRONIC DEVICE HAVING CONNECTING MECHANISM

BACKGROUND

1. Technical Field

The present disclosure relates to electronic devices; and particularly to an electronic device having a connecting mechanism for pivotally connecting two members.

2. Description of Related Art

Electronic devices, such as a liquid crystal displays (LCD), may include a housing for holding an LCD panel, a stand for supporting the housing, and a hinge for pivotably connecting the housing to the stand. The housing includes a front cover and a rear cover. The front cover engages with the rear cover to cooperatively define a receiving space for accommodating the LCD panel. The hinge includes a first pivotal member and a second pivotal member pivotably connected to the first pivotal member. One of the first and second pivotal members is secured to the rear cover or the front cover of the housing. However, when the first pivotal member rotates relative to the second pivotal member, a portion of the rear cover or the front cover of the housing for retaining the hinge is easily split or cracked.

Therefore, there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout five views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
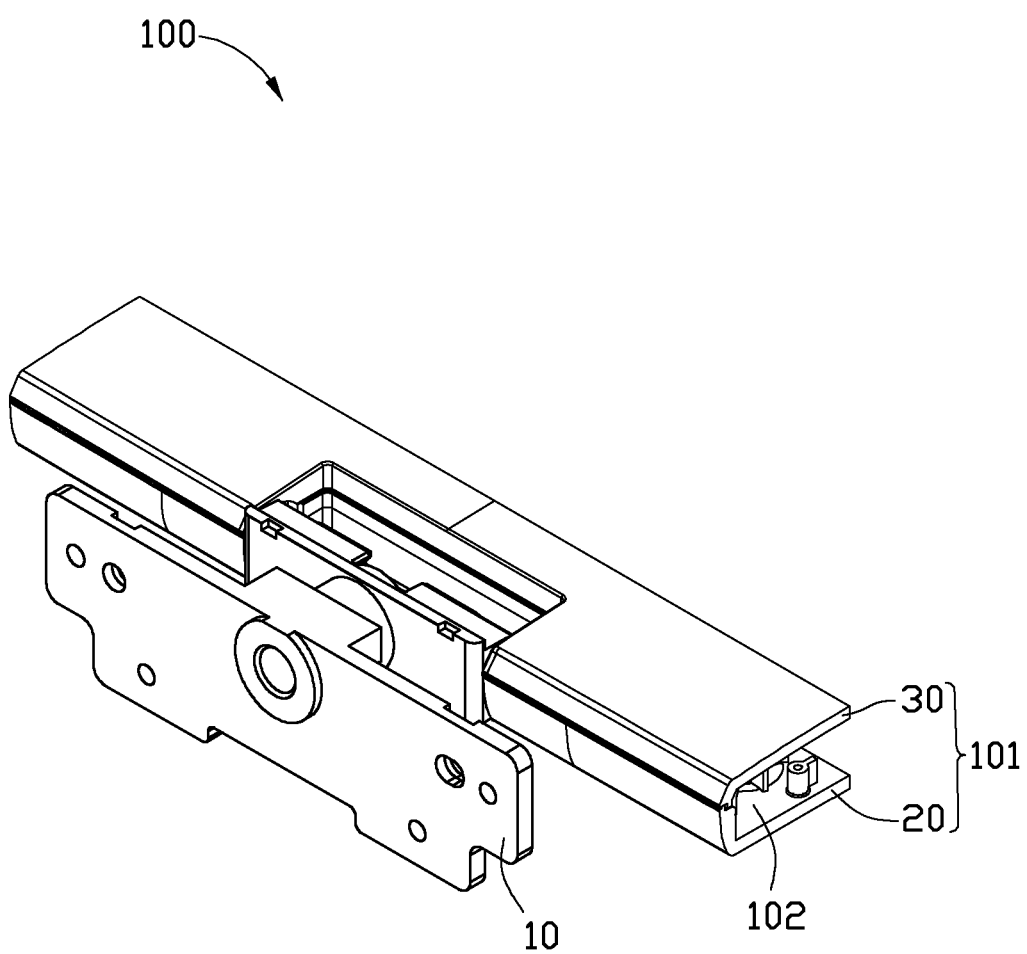
FIG. 1 is a partial perspective view of an electronic device in accordance with an exemplary embodiment.
Figure 2:
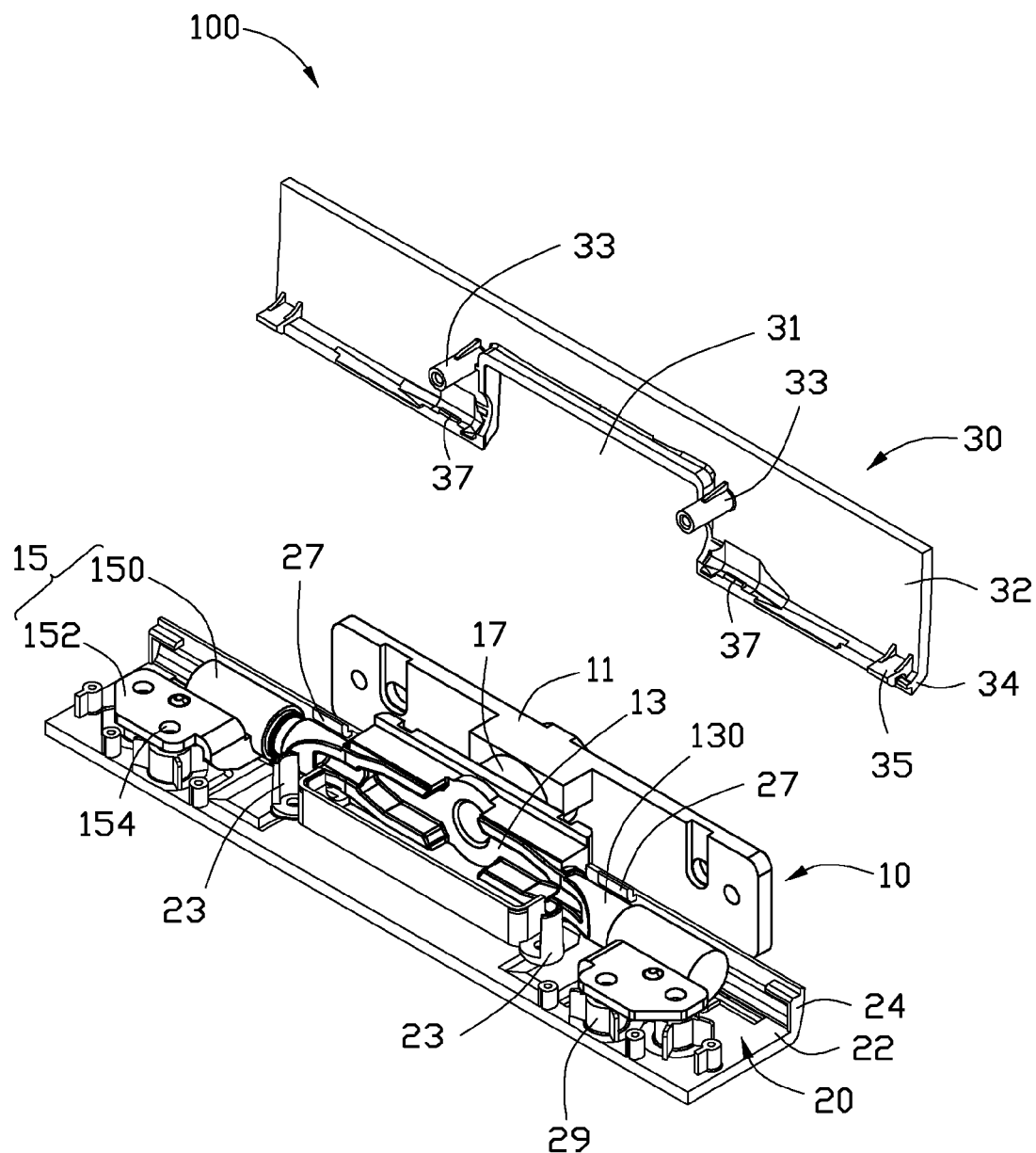
FIG. 2 is a partially disassembled perspective view of the electronic device of FIG. 1.

Referring to FIGS. 1 and 2, a partial perspective view of an electronic device 100 in accordance with an embodiment is shown. The electronic device 100 includes a housing 101 and a connecting mechanism 10 coupled to the housing 101. The connecting mechanism 10 connects the housing 101 to a stand or other electronic device (not shown). The housing 101 includes a front cover 20 and a rear cover 30. The front cover 20 engages with the rear cover 30 to define a receiving space 102 for accommodating a circuit board (not shown) and other electrical components (not shown). A part of the connecting mechanism 10 is received in the receiving space 102.

Figure 3:
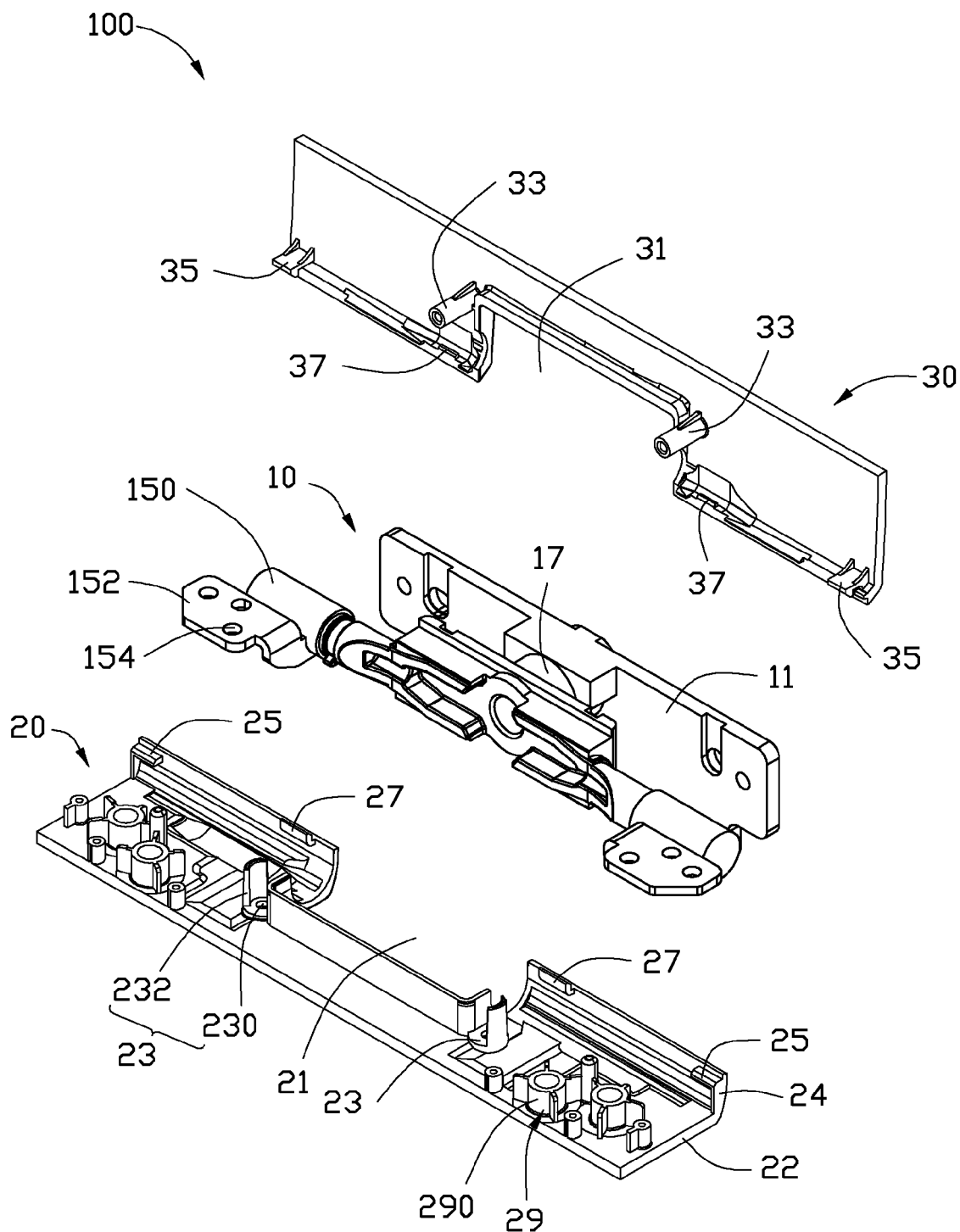
FIG. 3 is a disassembled perspective view of the electronic device of FIG. 1.
Figure 4:
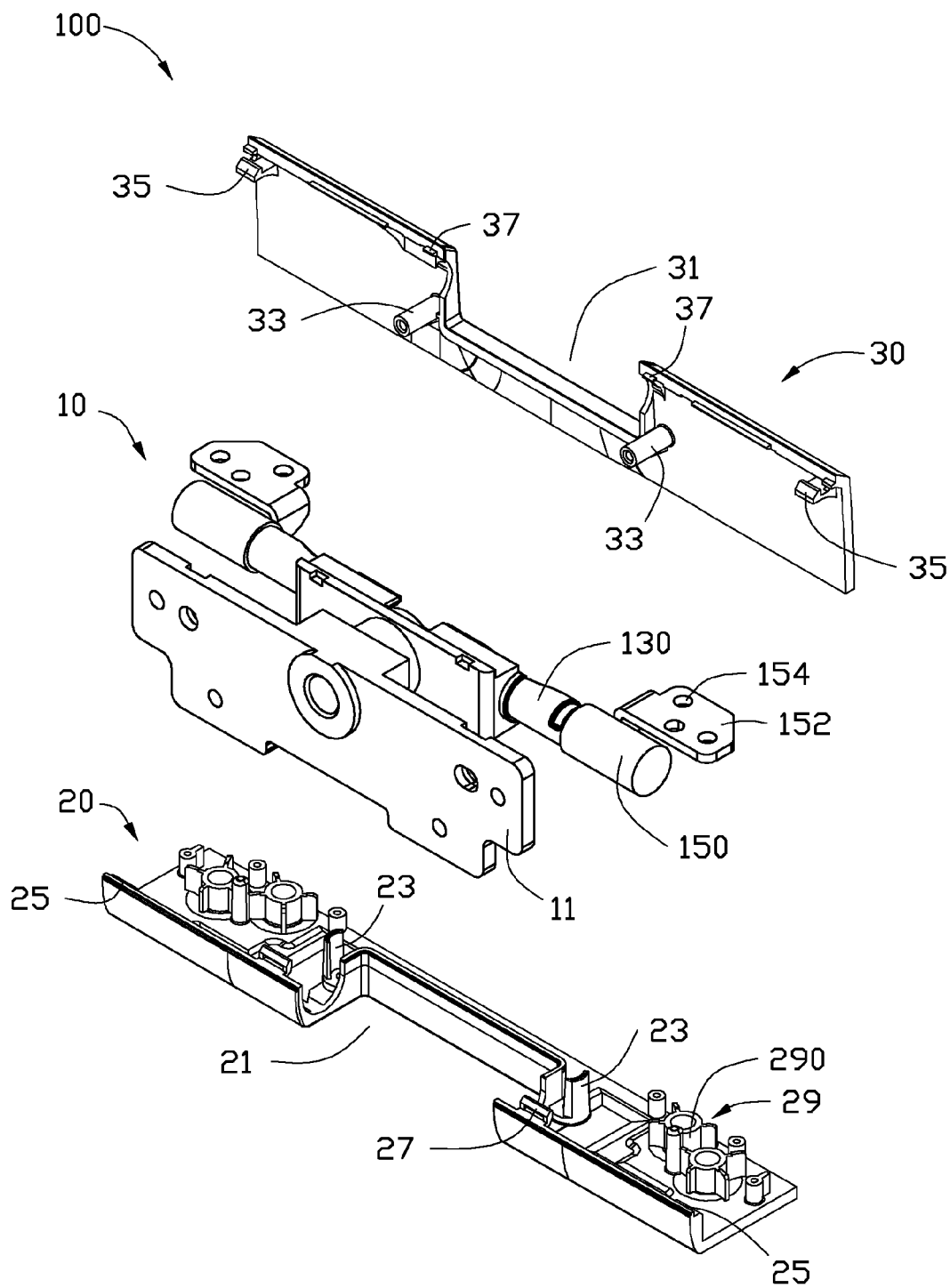
FIG. 4 is similar to FIG. 3, but viewed from another aspect.

Referring to FIGS. 2-4, the connecting mechanism 10 includes a first fixing member 11, a pivotal member 13, two second fixing members 15, and a connecting member 17 for connecting the pivotal member 13 to the first fixing member 11. The first fixing member 11 is secured to another electronic device, whereby the connecting mechanism 10 is secured to another electronic device. The pivotal member 13 is coupled to the first fixing member 11 via the connecting member 17. The pivotal member 13 includes a pivotal rod 130. The pivotal rod 130 is substantially parallel to the first fixing member 11 and is secured to the connecting member 17. The second fixing members 15 are pivotably connected to the opposite ends of the pivotal rod 130 respectively. Each second fixing member 15 includes a sleeve portion 150 and a fixing portion 152. The sleeve portion 150 pivotably sleeves on the pivotal rod 130, whereby the second fixing members 15 are pivotably coupled to the pivotal member 13. The fixing portion 152 is fixed to the sleeve portion 152. The fixing portion 152 defines a plurality of through holes 154. Bolts (not shown) extend through the through holes 154 to secure the fixing portion 152 to the front cover 20 of the housing 101. Thus, the connecting mechanism 10 is pivotably coupled to the housing 101.

The front cover 20 includes a first panel 22 and a first sidewall 24. The first sidewall 24 extends from a rim of the first panel 22. A plurality of posts 29 protrude from the first panel 22. The posts 29 correspond to the through holes 154 of the fixing members 152 respectively. Each post 29 defines a first thread hole 290. Bolts extend through the through holes 154 and thread into the first thread holes 290, thus, the fixing portions 152 are secured to the front cover 20. The front cover 20 defines a first recess 21 for receiving a part of the connecting member 17. The first recess 21 extends from the middle of the first sidewall 24 to the first panel 22. The first panel 22 is further provided with two limiting members 23. The limiting members 23 are arranged at opposite sides of the first recess 21. Each of the two limiting members 23 includes a fixing hole 230 and a limiting portion 232. The limiting portion 232 protrudes perpendicularly from the first panel 22 and is adjacent to the corresponding fixing hole 230.

Two engaging members 25 protrude from opposite ends of the first sidewall 24 along a direction parallel to the first panel 22. Two latching members 27 protrude from a rim of the first sidewall 24 away from the first panel 22. The latching members 27 are arranged at two opposite sides of the first recess 21 respectively, and are arranged between the two engaging members 25.

The rear cover 30 includes a second panel 32 and a second sidewall 34. The second panel 32 substantially corresponds to the first panel 22. The second sidewall 34 extends from a rim of the second panel 32 and substantially corresponds to the first sidewall 24. The rear cover 30 defines a second recess 31. The second recess 31 substantially corresponds to the first recess 21 to cooperatively form a space for receiving the connecting member 17. The recess 31 extends from the second sidewall 34 to the second panel 32. Two protrusions 33 protrude perpendicularly from the second panel 32 and are arranged at two opposite sides of the second recess 31 respectively. The protrusions 33 mate with the fixing holes 230 respectively and are respectively limited by the limiting portions 232. Each protrusion 33 defines a second threaded hole 332. Two limiting slots 35 are defined at two opposite ends of the second sidewall 34 respectively. The limiting slots 35 accept the engaging members 25 respectively and limit their movement. Two hook members 37 are defined at the second sidewall 34 and are arranged at two opposite sides of the second recess 31 respectively. The hook members 37 form a latch for the latching members 27 respectively to secure them once latched.

Figure 5:
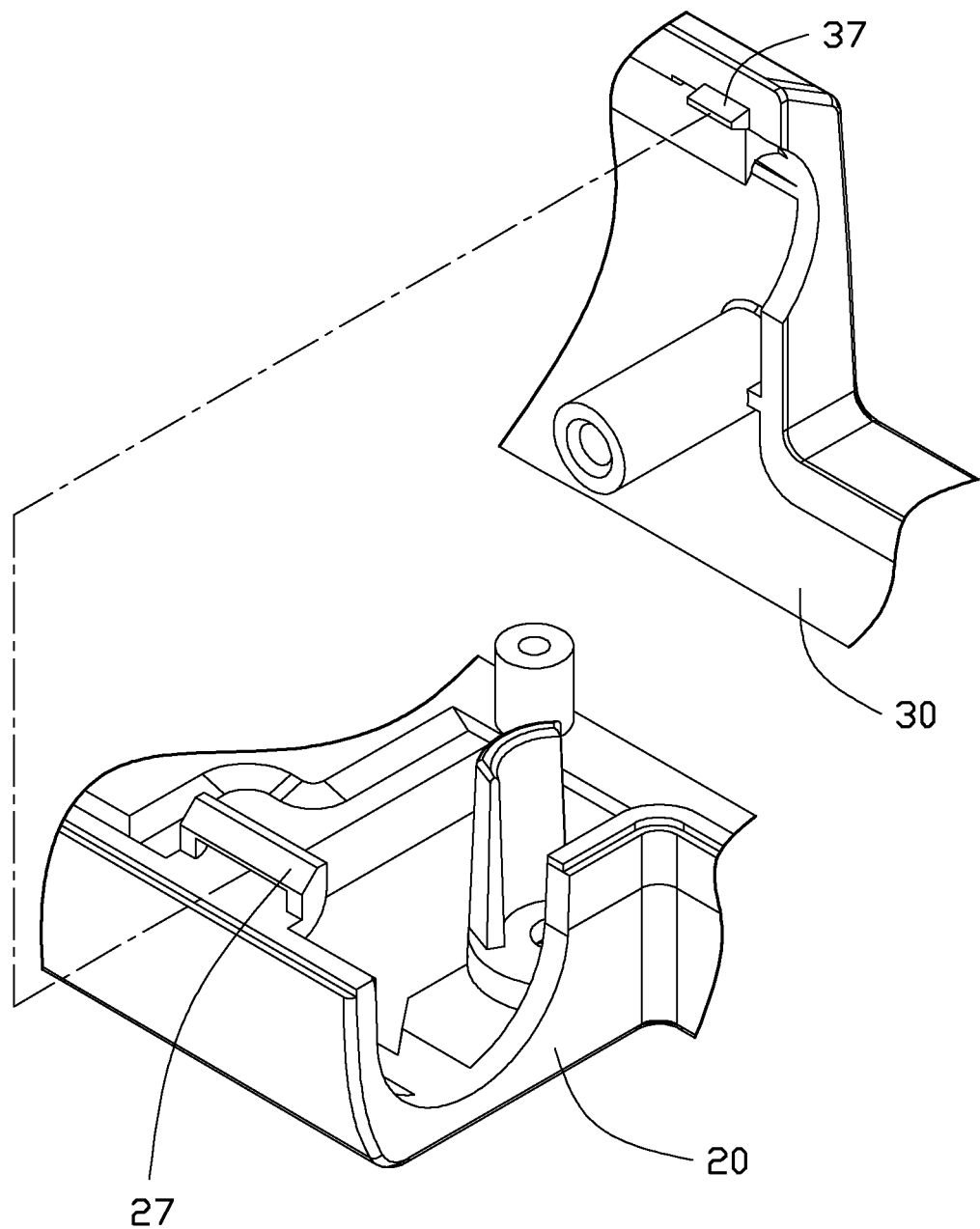
FIG. 5 is a partially assembled perspective view showing the front cover engaging with the rear cover of the electronic device of FIG. 4.

Referring further to FIG. 5, in assembly, firstly, the second fixing members 15 are pivotably sleeved on the pivot rod 13, and are further secured to the first panel 22 by bolts extending through the through holes 154 and the corresponding first thread holes 290. Secondly, the connecting member 17 is received in the space formed by the first and second recesses 21 and 31, and the pivotal rod 130 is disposed between the limiting members 23 and the latching members 27. Then, the movement of the engaging members 25 is limited within the corresponding limiting slots 35, at the same time, the hook members 37 engage with the corresponding latching members 27. Finally, bolts extend through the fixing holes 230 and thread into the second threaded holes 330 to fix the rear cover 30 to the front cover 20. Therefore, by virtue of the engaging members 25 being latched by the corresponding latching members and the hook members 37 being engaged by the corresponding latching members 27, the front cover 20 is secured to the rear cover 20 to protect the housing 101 from splitting or cracking.

It is to be understood, even though information and advantages of the present embodiments have been set forth in the foregoing description, together with details of the structures and functions of the present embodiments, the disclosure is illustrative only; and that changes may be made in detail, especially in matters of shape, size, and arrangement of parts within the principles of the present embodiments to the full extent indicated by the broad general meaning of the terms in which the appended claims are expressed.

What is claimed is:

1. An electronic device, comprising:
    a front cover comprising a first panel and a first sidewall extending from a rim of the first panel;
    a rear cover engaging with the front cover defining a receiving space, the rear cover comprising a second panel corresponding to the first panel and a second sidewall corresponding to the first sidewall, the second sidewall extending from a rim of the second sidewall; and
    a connecting mechanism partially received in the receiving space, the connecting mechanism comprising a first fixing member, a pivotal member, and a second fixing member, the pivotal member being fixed to the first fixing member, the second fixing member being pivotally connected to the pivotal member and fixed to the first panel;
    wherein the first panel is provided with two limiting members, the first sidewall is provided with two latching members, the second panel is provided with two protrusions corresponding to the limiting members, and the second sidewall is provided with two hook members corresponding to the latching member, the hook members engage with the latching members respectively, and the protrusions are secured to the limiting members respectively.

2. The electronic device of claim 1, wherein the front cover defines a first recess, the rear cover defines a second recess corresponding to the first recess, and the first and second recesses cooperatively defines a space for receiving a part of the connecting mechanism.

3. The electronic device of claim 2, wherein the latching members are arranged at opposite sides of the first recess respectively, and the hook members are arranged at opposite sides of the second recess respectively.

4. The electronic device of claim 3, wherein the first sidewall comprises two engaging members, and the engaging members are arranged at two opposite ends of the first sidewall respectively.

5. The electronic device of claim 4, wherein the second sidewall defines two limiting slots corresponding to the engaging members respectively, and the limiting slots are used for limiting the engaging members respectively.

6. The electronic device of claim 1, wherein the pivotal member comprises a pivotal rod, and the second fixing members are pivotally connected to opposite ends of the pivotal rod respectively.

7. The electronic device of claim 6, wherein each second fixing member comprises a sleeve portion, and the sleeve portion pivotally sleeves on an end of the pivotal rod.

8. The electronic device of claim 7, wherein the pivotal rod is arranged between the limiting members and the latching members.

9. The electronic device of claim 7, wherein the second fixing member further comprises a fixing portion, and the fixing portion is secured to the sleeve portion.

10. The electronic device of claim 9, wherein the fixing portion defines a plurality of through holes, and the second fixing members are fixed to the first panel via the through holes.

* * * * *